United States Patent [19]
Amoyal et al.

[11] Patent Number: 4,885,432
[45] Date of Patent: Dec. 5, 1989

[54] SPLICE CASE

[75] Inventors: William E. Amoyal, Maisons-Laffitte, France; Joris R. I. Franckx, Bonheiden, Belgium

[73] Assignee: Raychem Corporation, Menlo Park, Calif.

[21] Appl. No.: 178,033

[22] Filed: Apr. 5, 1988

[30] Foreign Application Priority Data

Apr. 6, 1987 [GB] United Kingdom ............... 8708136
Jun. 18, 1987 [GB] United Kingdom ............... 8714279

[51] Int. Cl.⁴ ........................................... H02G 15/113
[52] U.S. Cl. ........................................ 174/92; 174/93; 174/DIG. 8
[58] Field of Search ............... 174/91, 92, 93, DIG. 8; 428/36

[56] References Cited

U.S. PATENT DOCUMENTS

| 4,142,592 | 3/1979 | Brusselmans | 174/92 |
| 4,289,553 | 9/1981 | Wolf | 428/36 X |
| 4,347,402 | 8/1982 | Reyners | 174/93 X |
| 4,369,356 | 1/1983 | Tsurutani et al. | 428/36 X |
| 4,413,656 | 11/1983 | Pithouse | 174/DIG. 8 X |
| 4,468,536 | 8/1984 | Van Noten | 174/92 |
| 4,499,129 | 2/1985 | Kridl et al. | 174/92 X |
| 4,511,611 | 4/1985 | Moisson | 174/92 X |
| 4,535,526 | 8/1985 | Zerfass et al. | 428/36 X |
| 4,680,065 | 7/1987 | Vansant et al. | 174/DIG. 8 X |
| 4,689,474 | 8/1987 | Overbergh et al. | 174/DIG. 8 X |

FOREIGN PATENT DOCUMENTS

| 0196767 | 10/1986 | European Pat. Off. | 174/92 |
| 0237228 | 9/1987 | European Pat. Off. | |
| 1908996 | 12/1970 | Fed. Rep. of Germany | 174/93 |
| 1431167 | 4/1976 | United Kingdom | 174/93 |

Primary Examiner—Morris H. Nimmo
Attorney, Agent, or Firm—A. Stephen Zavell; Herbert G. Burkard

[57] ABSTRACT

A splice case for telecommunications cables is provided which is completely wraparound. Two rigid half shells (6) surround a wraparound impermeable sheet (4) to cover the central part of the splice. The impermeable sheet (4) provides sealing, and the half-shells (6) mechanical restraint. Wraparound end parts (12) are also provided and a sealing material (10) seals the impermeable sheet (4) to the half shells (6) and/or end-parts (12), so that the seal thus formed in not put into peel when the splice is pressurized.

20 Claims, 4 Drawing Sheets

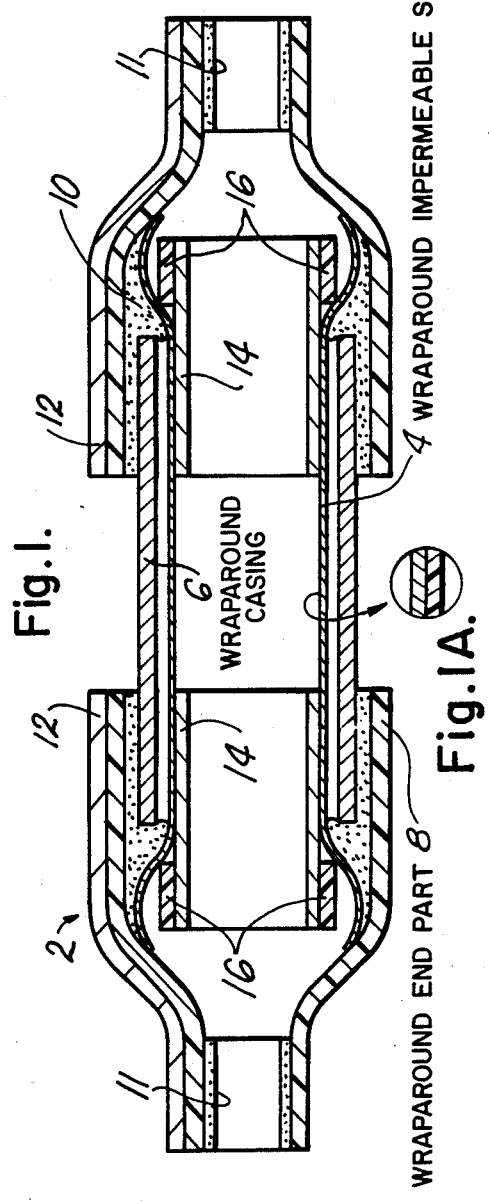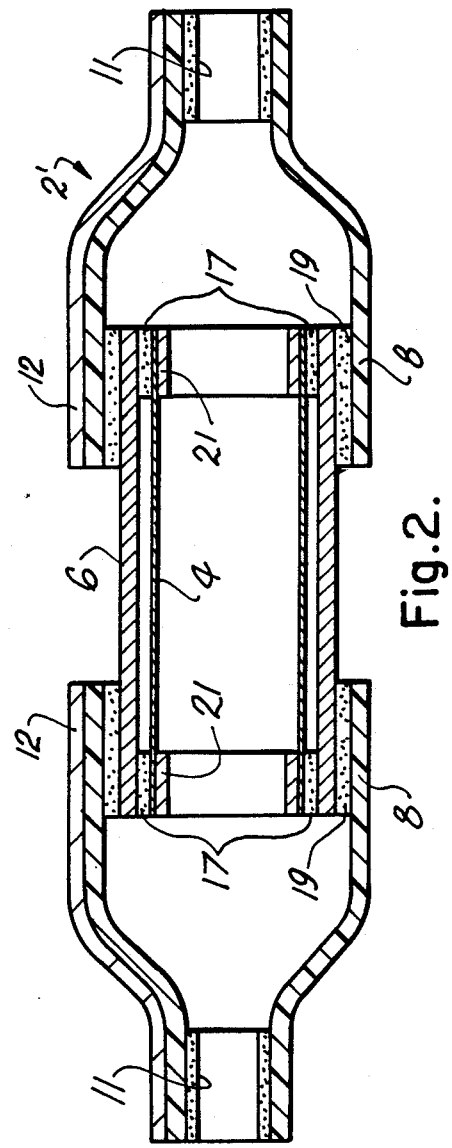

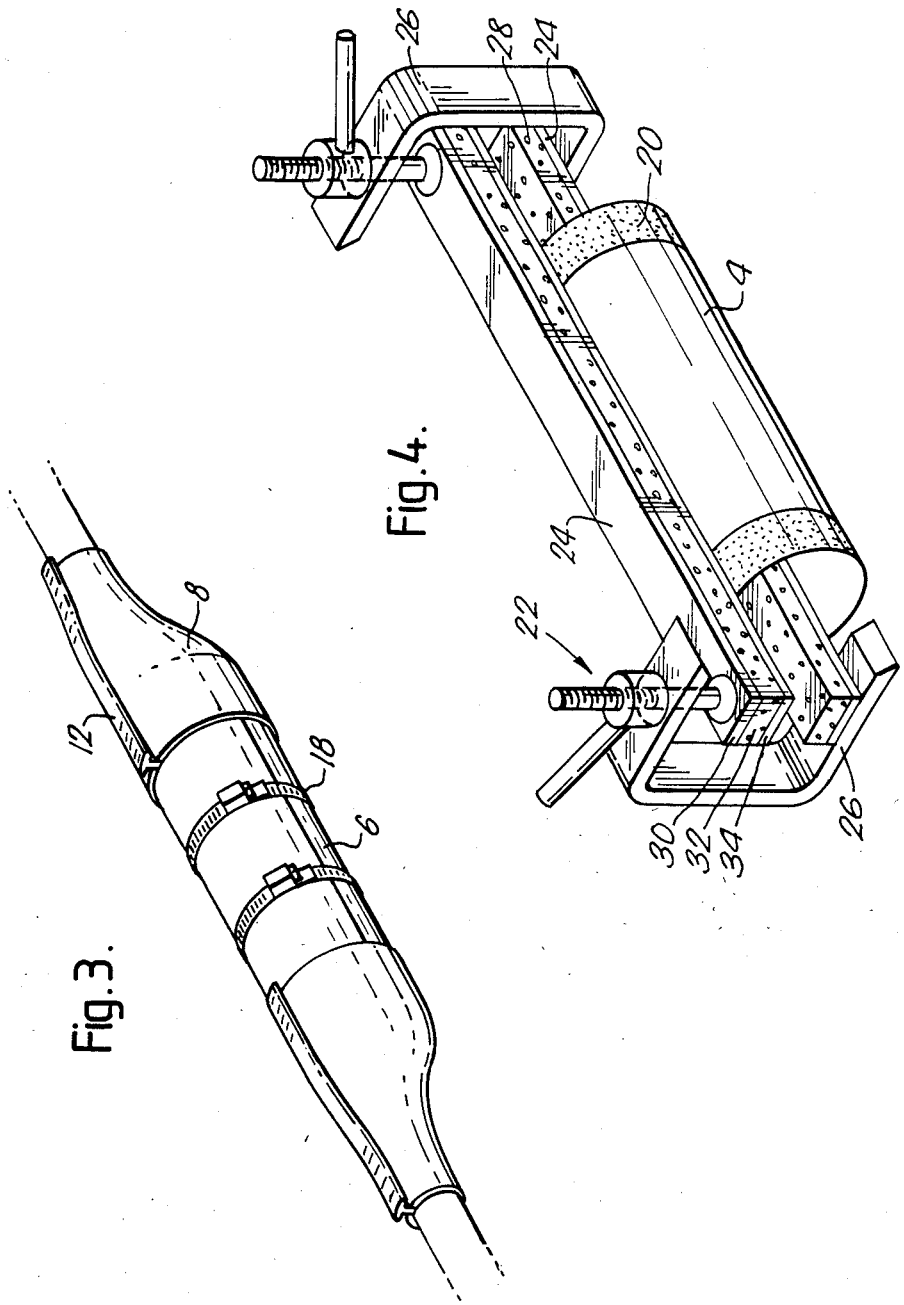

SPLICE CASE

This invention relates to splice cases for enclosing substrates such as splices in telecommunications cables, and preferably to pressurizable splice cases.

Splices between cables, for example, must be protected against the environment if corrosion an other chemical and mechanical damage is to be prevented. Such protection is provided by fabricating a splice case around the splice using plastics or other materials which are bonded or sealed to the cables at either side of the splice using high performance adhesives or sealants. Some cables are internally pressurized in order to help keep out contaminants such as water vapour and to provide quick warning of cable damage (by means of a noticeable localized pressure drop), and splice cases between such cables must be pressure resistant if pressure is to be transmitted along the cable and if the beneficial effects of pressurization are to be felt in the splice cases themselves.

European Patent Application Publication No. 0196767 describes a pressurisable splice case in which a flexible sheet is wrapped around a splice, and a rigid casing positioned around a flexible sheet. End plates are sealed to the interior surface of the rigid casing by a V-type seal which opens out in response to a pressure difference between the inside and the outside of a splice so that the seal is not put under a peel pressure. The casing and end plates are typically tubular.

We have discovered a new type of splice case which can be pressurised. It is completely wraparound in design. It does not need a V-seal closure to ensure a pressure-tight seal. As in European Patent Application No. 0196767 it uses a flexible sheet wrapped around the splice to form the seal.

Thus the present invention provides a wraparound assembly suitable for environmentally protecting a cable splice, which comprises:

(a) a flexible impermeable sheet that can be wrapped around the splice substantially totally to enclose the splice.

(b) a wraparound casing that can be positioned around the central portion of the wrapped splice.

(c) wraparound end parts that can be positioned to surround and be sealed to each end of the wraparound casing and (d) a sealing material positioned to seal the impermeable sheet to the wraparound casing and/or the wraparound end parts in such a way that the seal thus formed is not put into peel in response to a pressure that it higher inside than outside the splice.

The term "wraparound" is used herein to mean any part that can be positioned around an elongate object without access to its ends. Thus it includes a wrappable sheet, mating or hinged half shells and a split tube for example.

Preferably the wrapped impermeable sheet has a larger outer periphery than the inner periphery of the positioned casing. This means that the sheet is required to provide only sealing, and mechanical restraint is provided by the separate, and preferably rigid casing.

The impermeable sheet may comprise any suitable material. Preferably it comprises a metal foil, for example aluminium foil.

At least one longitudinally opposed edge of the wrapped sheet is preferably provided with sealing material, for example adhesive. The said edges are preferably overlapped and adhered together to form a tubular part, after wrapping about the splice. A hand operable tool is preferably provided to press the edges together to form the seal.

The exterior surface of the side edges of the wrapped sheet are preferably also coated with a sealing material, for example an adhesive.

In a preferred embodiment the assembly also comprises wraparound support rings which can be positioned around the splice within the impermeable sheet so that they extend within and support at least the end of the impermeable sheet.

In a first preferred embodiment the impermeable sheet extends through the casing and beyond the casing at each end to be beneath the wraparound end parts. In this case sealing material preferably seals the impermeable sheet directly to the wraparound end parts. Thus any excess pressure within the splice tends to push the impermeable sheet into contact with the wraparound end part and hence enhances the seal. It does not put the seal in peel.

The wraparound end part is preferably heat recoverable.

The use of a support ring is particularly advantageous where the wraparound end part is heat recoverable, especially heat shrinkable, as it means that when recovery occurs the impermeable member is squeezed between the support ring and the recovering end part. In this case the support ring preferably also comprises a resilient member onto which the recovering end part recovers. This enhances the seal formed.

A heat recoverable article is an article the dimensional configuration of which may be made substantially to change when subjected to heat treatment. Usually these articles recover, on heating, towards an original shape from which they have previously been deformed, but their term "heat shrinkable", as used herein, also includes an article which, on heating, adopts a new configuration even if it has not been previously deformed.

In their most common form, such articles comprise a heat-shrinkable sleeve or tube made from a polymeric material exhibiting the property of elastic of plastic memory as described for example in U.S. Pat. Nos. 2,027,962 and 3,086,242. The original dimensionally heat stable form may be a transient form in a continuous process in which, for example, an extruded tube is expanded, whilst hot, to a dimensionally heat unstable form but, in other applications, a preformed dimensionally heat stable article is deformed to a dimensionally heat unstable form in a separate stage.

In a second preferred embodiment according to the invention, the impermeable member is coterminous with the casing. Thus the bond between the sealing impermeable member and the casing is not subject to peel when the interior of the splice is subjected to excess pressure.

In all embodiments according to the invention the end parts may be sealed directly to the outer casing. In the said first preferred embodiment described above the same sealing mass seals the end parts to the casing and the ends parts to the inner foil. In the said second preferred embodiment different sealing masses are used.

As stated above the wraparound end parts are preferably heat recoverable. Preferably the sealing materials used are heat activatable, and the heat applied to effect recovery also activates the sealing material. The end parts are preferably intrinsically heated, and preferably contain a conductive polymeric material which can be powered electrically. In one embodiment the wraparound end parts are closed by a rail and channel closure, and the rails comprise metallic bus bars which provide the buses to the conductive end parts. Preferably the arrangement is such as described in patent application Publication No. 0117762. Preferably the end parts used are those supplied by Raychem under the trademark MPRE/AUTOFIT.

Preferably the casing is substantially rigid and the impermeable member highly flexible. This means the casing takes the mechanical stress and the impermeable sheet is required only to seal when the part is subjected to an excess internal pressure. The casing preferably comprises two half shells, but other arrangements, for example a split tube are also possible.

In a preferred embodiment, the casing comprises two half shells. The mating edges of these half shells are preferably provided wtih cooperating studs and apertures for easy relative positioning. Also the mating edges preferably have outwardly extending flanges which can be secured together to hold the two half shells together. Also the ends of the casing are preferably provided with means for improving sealing to the wraparound end parts. For example the ends of the casing may be provided with circumferential grooves on the external surface.

The impermeable sheet is preferably dimensionally heat stable.

As stated above longitudinally opposed edges of the wrapped impermeable sheet are preferably overlapped and sealed together to form a tubular part around the splice. This is done with a hand operable tool and can be done in a number of ways. Preferably the tool comprises two elongate plates which can be brought together to seal the overlapped edges. Each of the plates may comprise a rigid backing plate and a resilient foam strip, and one or both of the plates may be laminated with a heater layer, for example a constant wattage or conductive polymeric layer. The two plates are held together by a clamp which can move the plates towards or away from each other. In one embodiment one plate is positioned within the wrapped sheet and the other passes outside so that when brought together they seal the overlap. In another embodiment the overlapped parts are pinched up to an elongate ridge standing proud from the wrapped sheet and the plates positioned on either side of the ridge to form the seal. This means the hand operable tool does not need to be inserted into the wrapped impermeable sheet. This is advantageous where space considerations are limited. Once the seal has been made the ridge can be opened and flattened out again.

Instead of being provided on the tool the heater may instead be provided as a separate piece, or secured to the impermeable sheet. The heater may be provided outside the wrapped impermeable sheet or inside it. In preferred embodiment the overlapped parts of the wrapped impermeable sheet are pinched up into an elongate ridge. In this case the heater is preferably positioned within the ridge. Preferably it is secured, for example, by adhesive tape, to an internal surface of the ridge.

Even when the heater is separate, a pressing tool is preferably also required to provide pressure, to combine with the heat, to form a seal.

The heater which is preferably used is a conductive polymeric heater. A particularly preferred heater is described in European Patent Application No. 87301614.1

The heater preferably comprises integral electrodes for electrical powering and heating. Where the heater is within the wrapped foil the heater preferably extends beyond at least one end of the wrapped foil so the electrodes can be connected to the power source. The connection to the electrodes may conventially be provided on the externally applied pressing tool.

The tool described herein also forms part of the present invention.

In a preferred embodiment the impermeable sheet has a composite structure to provide the optimum performance. As stated before this composite structure preferably comprises aluminium foil. The foil provides impermeability, and also strength and stiffness. Stiffness is a particular advantage where the wrapped sheet is relatively long, since it avoids the inadvertent formation of bends in the sheet, which might otherwise cause leak paths. Also, in cases where the wrapped impermeable sheet is folded, for example into an upstanding ridge, to seal adjacent longitudinal edges together, the stiffness aids such folding. The aluminum foil is preferbly bonded on either side to a strengthening or strain relief layer. Preferred layers comprise Mylar. These strengthening/strain relief layers also increase the ultimate elongation of the aluminum. A further layer to give chemical resistance and/or puncture resistance and/or tear resistance is also preferably provided on the surface facing outwards of the wrapped sheet. This layer is desirable since the wraparound casing and wraparound end parts may both themselves provide a seal and chemicals and/or abrasive particles for example, may come into contact with the impermeable sheet. This further sheet preferably comprises a cross-linked high density polyethylene, for example Valeron as supplied by Van Leer. The composite structure preferably also comprises an adhesive layer on its outward facing surface (in the wrapped configuration) for sealing to itself (in the overlap region) and also to the wraparound casing and wraparound end parts. Finally an adhesive layer is preferably also provided on the inner surface of the wrapped sheet, at least on the overlap region to close the wrapped sheet. The adhesive preferably comprises a polyethylene copolymer. All the layers of the composite structure are preferably bonded together with a polyurethane thermoset adhesive or a hot melt film (preferably an ethylene copolymer). A particularly preferred composite impermeable sheet has the following laminate structure, where the layers are laminated together with polyurethane adhesive 25 microns thick polyethylene copolymer adhesive layer 75 micron thick dual layer of a stretched high density polyethylne 23 micron thick Mylar layer 12 micron thick aluminium layer 23 micron thick Mylar layer 50 micron thick linear low density polyethylene layer 25 micron thick polyethylene copolymer adhesive layer.

Embodiments of the invention will now be described, by way of example, with reference to the accompanying drawings, wherein:

FIG. 1 is a longitudinal sectional view through first embodiment according to the invention after recovery.

FIG. 1a illustrates an exploded view of Item 4, e.g., Mylar TM sheet, in FIG. 1.

FIG. 2 is a longitudinal sectional view through a second embodiment according to the invention after recovery.

FIG. 3 is a perspective view of the embodiments of FIGS. 1 or 2.

FIG. 4 is a perspective view of a tool sealing overlapping edges of the wrapped impermeable sheet of the assembly FIGS. 1, 2 and 3.

Figure 5:
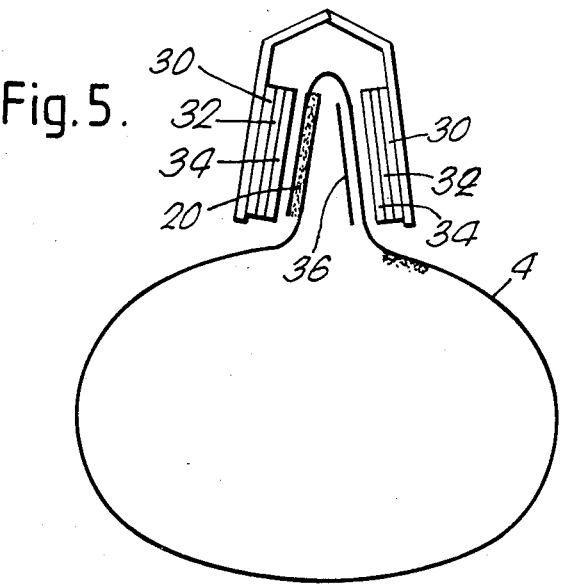
Figure 6:
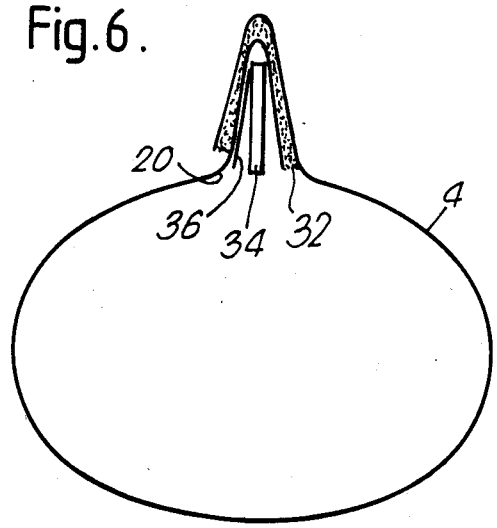
Figure 7:
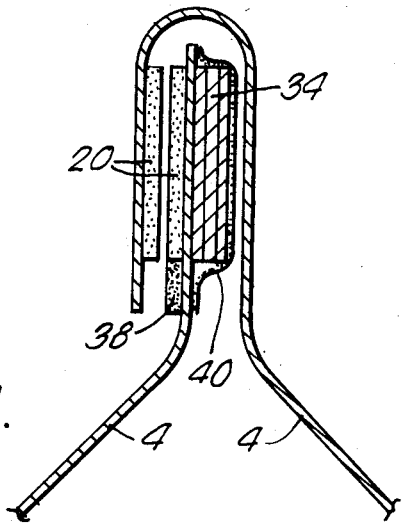
Figure 9:
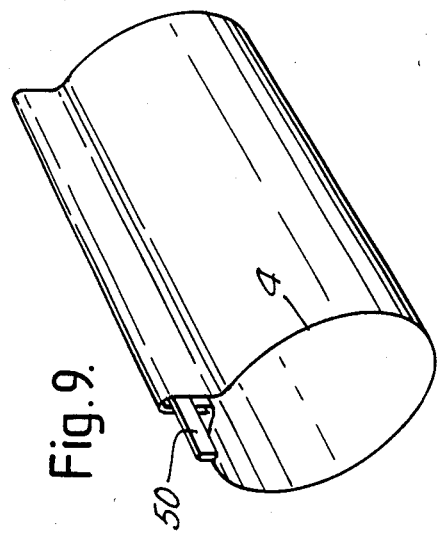
Figure 8:
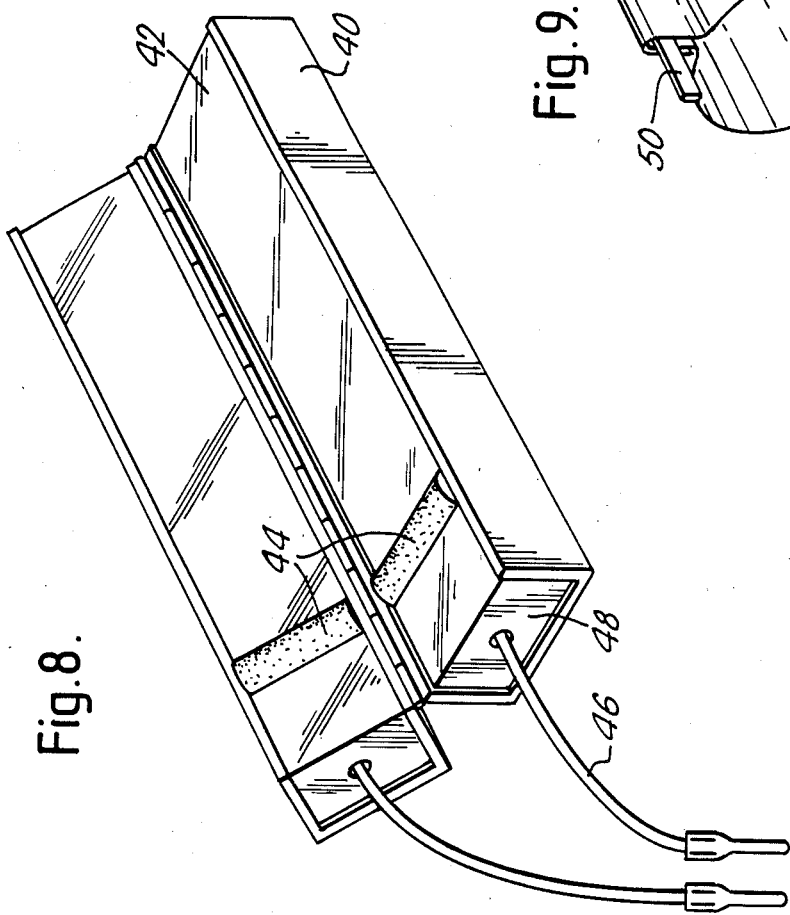

FIGS. 5, 6 and 7 are cross-sectional views of alternative arrangements for the impermeable sheet of FIGS 1, 2 and 3. FIGS. 8 and 9 show the tool and heater arrangement respectively for sealing the impermeable sheet of the arrangements of FIGS. 6 and 7.

Referring to the drawings, FIG. 1 shows an assembly 2 for forming a splice case for a splice between two cables. The assembly comprises an impermeable sheet in the form of a foil 4 wrapped to form a tubular shape. Overlapped edges are sealed together as described later (not shown in FIG. 1). Around the central part of the foil 4 is a rigid casing comprising half shells 6. Surrounding the ends of casing 6 and also ends of the foil 4 are heat recoverable conductive polymeric wraparound end parts 8 (shown after recovery). An adhesive 10 fills the space between the foil 4, the casing 6 and the end part 8. The relative positions of the parts of the assembly mean that adhesive bond 10, is not put under peel when the assembly is subjected to an internal pressure. The end parts 8 are closed by a channel 12. They are MPRE sleeves as sold by Raychem Corporation. A support ring 14 extend within the foils 4 and is coterminous therewith. A foam member 16 is fixed to the ring 14 on the outside thereof. This enhances the seal on recovery of end part 8.

The ends of end parts 8 furthest from the rigid casing 6 are shown in their recovered position. The internal surface at said ends is coated with adhesive 11 to seal to the underlying cables. For simplicity in the drawings the cables themselves are not shown.

FIG. 2 shows a second assembly 2' according to the invention. Foil sheet 4 has been wrapped and sealed to form a tubular shape as in FIG. 1, and similarly is surrounded by half shells 6. The half shells 6 are coterminous with the foil 4, and layer of adhesive 17 between the ends of foils 4 and half shells 6 seals them together. Since the foil 4 and half shells 6 are coterminous, an internal pressure within the assembled assembly does not put adhesive 17 in peel. End parts 8, identical to those in FIG. 1 surround casing 6 and are sealed thereto by adhesive layer 19, and to the cables (not shown) by adhesive 11. Supports 21 support the ends of foil 4.

FIG. 3 shows the assembled part of FIGS. 1 and 2 after recovery of end parts 8. The wraps 18 hold half shells 6 together. Any other convenient arrangement for holding half shells 6 together could also be used.

FIG. 4 shows a tool for sealing together overlapped edges of foils sheet 4. Hot melt adhesive 20 is provided on the underlying longitudinal edges (not seen in Figure) and the two end edges. The tool 22 comprises two plates 24, which may be brought together by clamps 26 to squeeze the overlapped longitudinal edges of the foil 4 together. Each plate 24 comprises a laminate of a rigid backing plate 30 and a foam plate 32. One plate also comprises an additional laminate layer which is a conductive polymeric heating layer 34. Layer 34 may be electrically powered to provide heat and hence melt the adhesive 20. The conductive polymeric layer is preferably in combination with electrodes which can be connected to an electrical power source to heat the conductive polymeric layer. Preferably two laminar electrodes of opposite polarity are provided on either side of the conductive polymeric layer. Preferably a heater as described in European Patent Application No. 87301614 is used.

Thus a combination of heating by layer 34 and pressure by clamps 26 forms the seal along the longitudinal edge of the wraparound foil 4. Tool 22 is hand operable, and can be used in the field.

FIG. 5 shows an alternative arrangement of overlapping edges of foil 4 which enables the tool 22 to be used completely externally of the foil 4. This may be advantageous in some applications, especially when space is limited. In this case the overlapped edges are folded up into a longitudinal ridges, and the tool 22 is positioned on either side of the ridge. The overlap extends on one side of the ridge and a layer of hot melt adhesive 20 extends along the overlap region to seal the sides of the overlapped edges to each other. A release layer 36 is included within the ridge to prevent opposed internal surfaces of the ridges bonding to each other. Thus the ridge can be opened and flattened out once the seal has been made.

FIGS. 6 and 7 show alternative arrangements where overlapping edges of foil 4 are pinched up into a ridge. In these examples a heater separate from the tool is used which is positioned inside the ridge.

In FIG. 6 the overlapped edges are again folded up into a longitudinal ridge. In this case the overlap extends on both side of the ridge, and a double layer of hot melt adhesive 20 is used, and the heater 34 is a separate entity extending along the ridge. As in the embodments of FIG. 5 a release layer 36 is included to prevent the internal surfaces of the ridge bonding to each other. Since the heater 34 is separate and inside the ridge a different type of tool must be used to apply the pressure to bond the overlapped edges of the foil 4. This is described later with reference to FIG. 8. Its positioning is generally as for tool 22 in FIG. 5.

FIG. 7 shows another embodiment in which the overlapped edges of foil 4 are folded into an upstanding ridge. In this case the overlap extends on one side of the ridge and hot melt adhesive 20 extends along about two thirds of both facing surfaces of the foil 20 in the overlap region. A pressure sensitive adhesive strip 38 is included on a remaining portion of the overlap surfaces. This is to allow easy registering of the overlapped portions of foil 4. A laminar conductive polymeric heater 34 with a central conductive core sandwiched between planar electrodes is positioned within the upstanding ridge. It is secured to the internal surface of the ridge by adhesive tape 40. The tape 40 is provided, on its surface facing away from the heater 34, with a release agent. This is in place of the release layer 36 of the embodiment of FIGS. 5 and 6, to prevent the opposed internal surfaces of the ridge bonding to each other.

FIG. 8 shows a preferred embodiment of tool which can be used to seal the overlapped edges of foil 4 where a separate heater strip (or one integral with foil 4) is used. It can be used for example with the embodiments of FIGS. 6 and 7. In this case the tool comprises two aluminium blocks 42 containing foam pads 44. The foam pads 44 are covered with Teflon coated paper for easy release from the overlapped foil 4. The tool is also provided with means for connection to the separate heater 34. Thus at one end it comprises connector ridges 44 which are in contact via leads 46 (which pass through spring loaded insulation block 48) to an electrical power source.

The tool as shown in FIG. 8 is applicable for connection to planar electrodes of a conductive polymeric heater. Where the heater 34 is within an upstanding ridge in foil 4 the heater is preferably arranged to extend beyond to the ends of the wrapped foil 4 so that connection to the tool can be made at one end. The extension of the heater beyond the ends of the foil 4 is illustrated by reference numeral 50 in FIG. 9.

I claim:

1. A wraparound assembly suitable for environmentally protecting a cable splice, which comprises:
    (a) a flexible impermeable sheet that can be wrapped around the splice substantially totally to enclose the splice;
    (b) a wraparound casing that can be positioned around the central portion of the wrapped splice;
    (c) wraparound end parts that can be positioned to surround and be sealed to each end of the wraparound casing; and
    (d) a sealing material associated with the impermeable sheet and positioned to seal the impermeable sheet to the wraparound casing and/or the wraparound end parts in such a way that the seal thus formed is not put into peel in response to a pressure that is higher inside than outside the splice.

2. An assembly according to claim 1, wherein the wrapped flexible impermeable sheet has a larger outer periphery than the inner periphery of the positioned casing.

3. An assembly according to claim 1, wherein at least one longitudinal opposed edge of the impermeable sheet is provided with a sealant, and the said longitudinally opposed edges are sealed together to form a tubular part.

4. An assembly according to claim 1, additionally comprising a wraparound support ring which can be positioned around the splice within the impermeable sheet so that it extends within and supports at least one end of the impermeable sheet.

5. An assembly according to claim 1, wherein the impermeable sheet, wraparound casing and wraparound end parts can be positioned such that respective ends of impermeable sheet can extend within and can be sealed to the respective wraparound end part.

6. An assembly according to claim 5, wherein the sealing material is positioned so it can seal respective ends of the impermeable sheet to the respective ends of the wraparound end parts.

7. An assembly according to claim 1, wherein the impermeable sheet, wraparound casing and wraparound end parts can be positioned such that respective ends of the impermeable sheet can extend within and can be sealed to respective ends of the wraparound casing.

8. An assembly according to claim 7, wherein the sealing material is positioned so it can seal respective ends of the impermeable sheet to respective ends of the wraparound central casing.

9. An assembly according to claim 1, wherein each wraparound end part overlaps and can be sealed to an end of the wraparound casing by sealing material positioned therebetween.

10. An assembly according to claim 1, wherein the wraparound end parts are heat recoverable.

11. An assembly according to claim 10, wherein the wraparound end parts comprise an intrinsic heater which can be heated by electrical powering to effect the recovery.

12. An assembly according to claim 11, wherein the wraparound end parts comprise a conductive polymeric material.

13. An assembly according to claim 10, wherein the sealing material(s) used are heat activatable and wherein the heat to effect recovery also activates the adhesive and thereby effects the sealing.

14. An assembly according to claim 1, in which the casing is substantially rigid and in which the sheet is highly flexible.

15. An assembly according to claim 1, in which the impermeable sheet is substantially dimensonally heat-stable.

16. An assembly according to claim 4, wherein the support ring comprises a resilient material which is compressed on recovery of the recoverable end parts.

17. An assembly according to claim 1, wherein the impermeable sheet comprises a composites structure.

18. An assembly according to claim 17, wherein the composite structure comprises a vapor impermeable layer bonded on at least one side to a strengthening layer.

19. An assembly according to claim 17, also incorporating a chemically resistant layer.

20. An assembly according to claim 3, comprising a heater secured to the impermeable sheet, which can provide heat to the sealant to enhance or to form the seal to form the wrapped sheet into a tubular part.

* * * * *